United States Patent Office 2,799,639
Patented July 16, 1957

2,799,639

METHOD OF DECOLORIZING EPICHLOROHYDRIN

Robert F. Huston, Lake Jackson, Tex., assignor to The Dow Chemical Company, Midland, Mich., a corporation of Delaware No Drawing. Application April 11, 1955,
Serial No. 500,674

3 Claims. (Cl. 204—158)

This invention concerns a method of decolorizing epichlorohydrin. It relates more particularly to a method of treating epichlorohydrin containing color which is difficultly separable therefrom by distillation, which method results in a significant reduction of the color of the epichlorohydrin.

Epichlorohydrin is commonly prepared by the alkaline hydrolysis of glycerol dichlorohydrin, e. g. by treating glycerol dichlorohydrin with an aqueous solution of sodium hydroxide. The crude epichlorohydrin thus produced is usually purified by fractional distillation. The resulting material is of high quality, i. e. 95 percent or higher, and is suitable for many purposes such as an intermediate or starting material in the preparation of other chemical compounds or compositions.

However, the epichlorohydrin thus produced is usually discolored, apparently by the presence of minute quantities of by-product materials of unknown composition and incident to its manufacture, which discoloration detracts from its utility for some purposes for which it is otherwise suited, e. g. the manufacture of epoxy resins. This epichlorohydrin can be further purified by repeated fractional distillation to reduce the amount of substances, which though present in only minute traces, impart an "off" color to the product. The purification treatment necessary to produce epichlorohydrin of a quality meeting American Public Health Administration, or Hazen standard, color specifications of 15 maximum, involves repeated fractional distillations, e. g. fractionally distilling the material, saving the cut of best color and redistilling this cut to obtain a product having a color meeting the above specifications. Such treatment is time-consuming, laborious and expensive. Treatment of the colored epichlorohydrin with usual decolorizing agents such as activated charcoal, or with an aqueous solution of sodium bisulfite or sodium hypochlorite have been ineffective to remove the color, or to produce a product of satisfactory color.

It is a primary object of the invention to provide a method of decolorizing epichlorohydrin. Another object is to provide a method of treating epichlorohydrin containing color which is difficultly separable therefrom by fractional distillation, which method results in a significant lowering of the color of the compound. A specific object is to provide a method of treating epichlorohydrin, prepared by the alkaline hydrolysis of glycerol dichlorohydrin, which method results in the production of epichlorohydrin that is free or substantially free from color. Other and related objects may appear from the following description of the invention.

According to the invention off-colored epichlorohydrin can readily be decolorized, or the color of the material substantially reduced, by subjecting the epichlorohydrin to exposure to rays of actinic radiation, preferably in the presence of air or oxygen. More specifically, off-colored epichlorohydrin produced by the alkaline hydrolysis of glycerol dichlorohydrin having a color not substantially greater than 100 (A. P. H. A. scale) can readily be obtained as a colorless or substantially colorless material by a procedure which involves fractionally distilling the crude epichlorohydrin to obtain a product of high purity, e. g. 95 percent epichlorohydrin or higher, and subjecting the distilled epichlorohydrin to exposure to actinic light, suitably in the presence of air or oxygen.

The light to be employed is light which is rich in actinic rays having wave lengths between about 2000 and 5000 angstrom units. The light may be obtained from any source. Suitable light is sunlight, light from a carbon electrode arc lamp, or a mercury vapor lamp such as an A–H4, 100 watt mercury vapor lamp (General Electric Company).

The procedure which is simple, rapid and inexpensive, is highly effective in making colorless or substantially colorless epichlorohydrin of a grade that meets standard specifications, i. e. has a color of 15 or less (A. P. H. A. scale). The method is particularly effective in the production of epichlorohydrin from glycerol dichlorohydrin by alkaline hydrolysis, i. e. in the manufacture of epichlorohydrin by hydrolysis of glycerol dichlorohydrin with an aqueous solution of sodium hydroxide.

The method can be carried out by distilling a highly colored, or crude epichlorohydrin to obtain epichlorohydrin of high purity, but containing color which is difficult to remove by fractional distillation, preferably a color not exceeding 100 (A. P. H. A. scale), and subjecting the distilled off-colored epichlorohydrin to exposure to actinic radiation, i. e. to light rich in wave lengths between about 2000 and 5000 angstrom units, suitably in the presence of air or oxygen.

The method can conveniently be carried out by feeding the epichlorohydrin to a distillation column, separating epichlorohydrin as distillate and exposing the liquid distillate to actinic radiation as it is separated. On a commercial scale the distillate, i. e. the epichlorohyrdin, can be subjected to actinic radiation by passing the same through a glass or quartz, tube or vessel, exposed to sunlight, or in a vessel fitted with a well made of heat resistant glass, or quartz, so that the contents of the vessel can be exposed to actinic rays from a suitable lamp such as an A–H4, 100 watt mercury vapor lamp placed in the well.

The time for which the epichlorohydrin is exposed or subjected to the actinic light can be varied over a wide range, depending in part upon the intensity of the light and in part upon the degree of color of the epichlorohydrin. In general the exposure of off-colored epichlorohydrin having a color not exceeding 100 (A. P. H. A. scale) to actinic radiation for only a few minutes, e. g. from 5 to 10 minutes, is effective in producing a significant lowering in the color of the material, and exposure of the epichlorohydrin to actinic light for a period of from 15 to 30 minutes or more is usually satisfactory to produce a colorless or substantially colorless material. The epichlorohydrin should not be exposed to the actinic radiation for prolonged periods of time such as a period of from 7 to 12 days in ordinary sunlight since overexposure of the epichlorohydrin to actinic light results in discoloring of the material.

However, epichlorohydrin which is highly discolored, or which becomes highly discolored upon storage for prolonged periods of time can be decolorized by the invention by distilling the same, separating epichlorohydrin of high purity, e. g. 95 percent or more, as distillate containing color in amount not substantially greater than that corresponding to 100 (A. P. H. A. scale) and subjecting the distillate to actinic radiation as herein described.

The term "decolorize" employed herein pertains to the accepted meaning of the prefix "de" in combination with the word "colorize" as the reduction or depriving of color.

The epichlorohydrin to be treated, i. e. subjected to actinic radiation, to destroy or reduce the color can be stored for periods of from one to sixty days prior to treatment by the invention. However, the method is most effective when applied to freshly distilled epichlorohydrin, i. e. the liquid distillate as it is condensed and taken away from the still, or material which has been distilled and stored for only a short time, e. g. for periods of from one to ten days.

The method can be carried out in the substantial absence of air or oxygen, e. g. at subatmospheric pressure, but is less satisfactory than when carried out in the presence of air at atmospheric or substantially atmospheric pressure. Only small amounts of air or oxygen are required. An amount of air such as that occupying the free space in a one liter flask filled to from one-half to three-quarters of its capacity with off-color epichlorohydrin having a color of 100 (A. P. H. A. scale) is more than sufficient to be effective in producing a colorless or substantially colorless product upon exposure of the epichlorohydrin to actinic light, e. g. sunlight or rays from an A–H4 mercury vapor lamp, for a period of from about 15 to 30 minutes. The epichlorohydrin need not be agitated or mixed with the air during exposure to the actinic light, it being sufficient that exposure of the epichlorohydrin to the light be carried out in the presence of air or oxygen, preferably air.

In a preferred practice the crude epichlorohydrin produced by the alkaline hydrolysis of glycerol dichlorohydrin with an aqueous solution of sodium hydroxide, is fractionally distilled. The distillate, which is discolored by the presence of minute traces of by-product materials of unknown composition and usually has a color between about 50 and 100 (A. P. H. A. scale) is exposed to actinic radiation preferably sunlight, for a period of time of from 5 to 30 minutes or more with resultant decolorizing of the product and the production of epichlorohydrin of a good grade, e. g. epichlorohydrin having a color of 20 or less (A. P. H. A. scale).

The following examples illustrate ways in which the principle of the invention has been applied, but are not to be construed as limiting its scope.

*Example 1*

(A) A charge of 500 ml. of epichlorohydrin, which was made by hydrolyzing a dilute aqueous solution of glycerol dichlorohydrin with an aqueous solution of sodium hydroxide and distilling the crude epichlorohydrin, was placed in the still pot of a laboratory distillation apparatus. The material was distilled through a 30-plate bubble-cap column at atmospheric pressure employing a 3:1 reflux ratio. The first 100 ml. of distillate was discarded. The second 100 ml. of distillate was collected and its color determined. The epichlorohydrin had a color of 50 (A. P. H. A. scale).

(B) The epichlorohydrin having a color of 50 obtained above was placed in a 200 ml. Pyrex glass vessel with air occupying the free space above the liquid. The vessel and contents were exposed to sunlight for a period of 15 minutes. Thereafter, the epichlorohydrin had a color of only 20 (A. P. H. A. scale).

*Example 2*

In each of a series of experiments, 100 ml. of epichlorohydrin obtained as described in Example 1 and having a color value as stated in the following table was placed in a glass vessel and exposed to sunlight with the surface of the liquid in contact with air, i. e. exposed to atmospheric pressure, for a period of 0.5 hour. Thereafter, the epichlorohydrin was tested to determine its color. The table identifies the experiments and gives the color (A. P. H. A. scale) for the epichlorohydrin before exposure to sunlight and after exposure of the epichlorohydrin to sunlight in the presence of air.

TABLE

| Test No. | Color Before Exposure to Sunlight | Color After Exposure to Sunlight |
| --- | --- | --- |
| 1 | 50 | 30 |
| 2 | 60 | 40 |
| 3 | 100 | 50 |

*Example 3*

A charge of 100 ml. of epichlorohydrin obtained by procedure similar to that described in Example 1, and having a color of 50 (A. P. H. A. scale) was placed in a Pyrex glass flask. The epichlorohydrin was heated at a temperature of 35° C. under vacuum until about 30 ml. of the material was evaporated. The flask containing the remaining portion of the epichlorohydrin was sealed. The flask and its contents were exposed to sunlight for a period of 15 minutes. Thereafter, the epichlorohydrin was removed from the flask and its color determined. The epichlorohydrin had a color of 40 (A. P. H. A. scale).

*Example 4*

Epichlorohydrin prepared by procedure similar to that described in Example 1 was continuously distilled through a packed column approximately 24 feet high at atmospheric pressure employing a 10:1 reflux ratio. The product, i. e. the distillate, was 97.3 percent by weight epichlorohydrin and had a color of 70 (A. P. H. A. scale). Test portions of the epichlorohydrin product were placed in glass vessels with air occupying the free space above the liquid. Some of the test portions were exposed to sunlight for a period of about 30 minutes. Other of the test portions were exposed to light from an A–H4, 100 watt mercury vapor lamp (General Electric Company) for a period of about 30 minutes. Thereafter, the color of the test portion of the epichlorohydrin was determined. Each source of light was effective in lowering the color of the epichlorohydrin to a value of only 5 (A. P. H. A. scale.)

I claim:

1. A method of decolorizing epichlorohydrin containing colored impurities incident to its manufacture and difficulty separable therefrom by distillation, said epichlorohydrin having been prepared by reacting glycerol dichlorohydrin with an aqueous solution of sodium hydroxide, separating crude epichlorohydrin from the reacted mixture and distilling the crude epichlorohydrin to obtain distillate consisting of at least 95 percent by weight of epichlorohydrin having a discoloration not exceeding 100 A. P. H. A. units, which method comprises subjecting the freshly distilled distillate to actinic radiation consisting essentially of light having wave lengths between 2000 and 5000 angstrom units in the presence of air for a time of from 5 to 30.

2. A process as claimed in claim 1, wherein the distillate is exposed to sunlight.

3. A process as claimed in claim 1, wherein the distillate is exposed to actinic radiation from a mercury vapor lamp.

References Cited in the file of this patent

UNITED STATES PATENTS

| 939,733 | Minor | Nov. 9, 1909 |
| 1,948,281 | Smith | Feb. 20, 1934 |
| 2,149,765 | Goos et al. | Mar. 7, 1939 |
| 2,393,509 | Archibald et al. | Jan. 22, 1946 |
| 2,647,868 | Dean | Aug. 4, 1953 |